United States Patent [19]
Vaughan et al.

[11] 3,967,091
[45] June 29, 1976

[54] CAPILLARY FLOW WELD-BONDING

[75] Inventors: Robert W. Vaughan, Manhattan Beach; Robert J. Jones, Hermosa Beach, both of Calif.

[73] Assignee: The United States of America as represented by the United States National Aeronautics and Space Administration, Washington, D.C.

[22] Filed: Jan. 2, 1975

[21] Appl. No.: 538,047

[52] U.S. Cl. .................................. 219/92; 219/118
[51] Int. Cl.² ................... B23K 11/10; B23K 11/18
[58] Field of Search ............................. 21/92, 118

[56] References Cited
UNITED STATES PATENTS

| | | | |
|---|---|---|---|
| 2,452,805 | 11/1948 | Sussenbach | 219/92 X |
| 3,337,711 | 8/1967 | Garscia | 219/92 |

*Primary Examiner*—J. V. Truhe
*Assistant Examiner*—David A. Tone
*Attorney, Agent, or Firm*—Robert Kinberg; Robert F. Kempf; John R. Manning

[57] ABSTRACT

Structurally stronger titanium articles are produced by a weld-bonding technique comprising fastening at least two plates of titanium together using spot-welding and applying a bead of adhesive along the edge of the resistance spot-welded joint which, upon heating, flows and fills the separation between the joint components.

2 Claims, 3 Drawing Figures

CAPILLARY FLOW WELD-BONDING

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

Prior to the present invention, weld-bonding was limited primarily to aluminum alloy structures using an epoxy adhesive resin. Advancing technological requirements rendered weld-bonded aluminum alloy structures using epoxy adhesives unsuitable for temperatures beyond 450 K maximum. Thus, weld-bonding of titanium metal using a high temperature adhesive system are the materials currently used when the temperatures exceed 450 K.

High temperature adhesives which could be used for the weld-bonding applications are polyimides, polypyrrones, polybenzimidazole, polyquinoxalines, polyphenylquinoxalines, or polyimidazoquinazolines. Several problems arise from the use of these adhesives in conjunction with titanium weld-bonding techniques. All of the high temperature polymers which have been considered for adhesive systems are condensation cured and evolve gaseous products during the cure. The high void content of these adhesives may be overcome by applying pressure during cure of the adhesive. However, where the workpiece is extremely large, application of pressure to collapse the voids and extrude a small portion of resin from the bond joint may require a very large machine or may be impossible. Thus, adhesives which evolve only a small amount of gaseous byproducts upon curing are preferred.

U.S. Pat. No. 3,337,711 teaches the prior art method of weld-bonding two pieces of metal using a thermally softenable adhesive. The patentee shunts the current between the metal layers to be bonded, causing the metal layers to heat and soften the adhesive resin. This method of weld-bonding is not applicable to titanium because of titanium oxidative instability. When titanium is welded, care is taken to prevent excessive heating of the titanium workpiece, and this is usually done by using refrigerated electrodes.

SUMMARY OF THE INVENTION

Where weld-bonding of titanium joints is required to increase fatigue strength, capillary-flow weld-bonding may be used. Briefly, the process involves spot-welding at least two titanium plates together and, subsequently, laying a bead of the resin adhesive along the edge of the welded joint. Upon exposure to heat to cure the adhesive, the resin softens and is drawn by capillary action into the space between the plate joints where it is cured. This fabrication procedure is simple because the spot-welding can be accomplished in the usual manner, and once the welding step has been accomplished, the adhesive can be applied and cured. These two steps can be independent of each other, except the adhesive application and cure should be made within four hours of cleaning the titanium surfaces.

Adhesives used in the present invention must be readily flowable, but have sufficient consistency that they do not run excessively during bonding to the metal joint. These adhesives are selected from a group of polymers having low curing temperatures and high performance characteristics. Generally, these polymers are synthesized by a Diels-Alder reaction of a bis(furfurylimide) with a bis(maleimide).

DESCRIPTION OF THE PREFERRED EMBODIMENTS

Because titanium forms an oxide coating upon exposure to air, the surfaces of the titanium workpiece to be weld-bonded must be cleaned before spot-welding. Although the steps of spot-welding and adhesive cure are substantially independent, cleaning of the joint presents formidable problems after the spot-welding has been accomplished. Thus, surface cleaning necessary for the spot-weld, must be effected prior to the spot-weld. Also, because the titanium surface oxidizes rapidly in air, the adhesive application should be made within four hours after the cleaning treatment.

Preparation of the titanium surfaces involves degreasing with a solvent followed by immersion in a mild acid bath. The acid is removed then by rinsing in distilled water, and the surface is dried by warm air.

Adhesives used in the present process comprise a varnish solution of an aromatic bis(maleimide) with equal parts of an aromatic bis(furfuryl)imide. Finely divided aluminum powder is added to the varnish formulation to reduce the resin flow during heating. In addition, the aluminum provides a material which will expand during the heat-cure of the resin, and thereby apply pressure against the titanium surfaces. This is particularly advantageous where a large piece of titanium is being spot-welded and clamping or pressing the large piece would be impractical. In this way, the aluminum assures good contact with the titanium surfaces and collapses any voids which may be present due to uneven application of the resin or other purely mechanical reasons.

Figure 2:
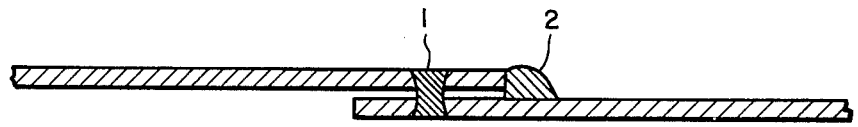
FIG. 2 is a cross-sectional side elevation taken through line 2—2 passing through the center spot-weld and showing the resin adhesive bead prior to capillary flow between plates.

FIG. 2 shows a cross-sectional view of a lap-joint through spot-weld nugget 1 and adhesive bead 2. Upon the application of heat, adhesive bead 2 softens and flows filling space 3.

ADHESIVE BOND ONLY

A polymeric adhesive composition was prepared by preparing a two-component polymer from bis(2-furfuryl)pyromellitimide and bis(4-maleimidophenyl)methane according to the following example.

EXAMPLE I

SYNTHESIS OF BIS(2-FURFURYL) BENZOPHENONE TETRACARBOXYLIC IMIDE

To a mixture of 258 g (0.8 moles) of benzophenone tetracarboxylic dianhydride and 600 ml of dimethylformamide was added 150 g (1.6 moles) of furfurylamine dropwise over a 30-minute period. The mixture was stirred an additional 20-minutes and then 1,000 ml of xylene was added. The reactions mixture was heated to reflux and heating was continued for 16-hours during which time the water from the imidization reaction was collected in a Dean-Stark trap. The mixture was cooled to 273° K (32°F) and the resulting precipitate was collected by filtration. Recrystallization from acetone afforded 114 g (76%) of bis-imide; mp 495°–497 K (430°–437°F).

EXAMPLE II

SYNTHESIS OF BIS(2-FURFURYL) PYROMELLITIMIDE

To a mixture of 87.2 g (0.4 moles) of pyromellitic dianhydride and 300 ml of dimethylformamide was added 77.6 g (0.8 moles) of furfurylamine dropwise over a 30-minute period. The mixture was stirred an additional 20-minutes and then 500 ml of xylene was added. The reactions mixture was heated to reflux and heating was continued for 16-hours during which time the water from the imidization reaction was collected in a Dean-Stark trap. The mixture was cooled to 273° K (32°F) and the resulting precipitate was collected by filtration. Recrystallization from acetone afforded 114 g (76%) of bis-imide; mp 495°–497 K (430°–437°F).

EXAMPLE III

SYNTHESIS OF BIS(4-MALEIMIDOPHENYL) METHANE

To a solution of 158 g (0.8 mole) of methylenedianiline in 480 ml of dimethylformamide was added a solution of 157 g (1.6 moles) of maleic anhydride in 240 ml of dimethyl formamide at such a rate as to keep the temperatures below 343° K (158°F). After stirring the mixture for an additional 15-minutes, it was cooled to room temperature and 204 g (2 moles) of acetic anhydride followed by 16 g (0.2 moles) of sodium acetate was added. The resulting mixture was heated to 323° K (122°F) and maintained there for three hours. The crude product was precipitated by pouring the reaction mixture into 4,000 ml portions of water. The precipitate was collected by filtration, washed twice with 4,000 ml portions of water and dried. Crystallization from methanol afforded 203 g (71%) of bis-imide; mp 429°–432 K (312°–319°F).

The adhesive resin was prepared by mixing the bis-(furfuryl)imide with equal parts of bis(maleimide) and 150 parts by weight of powdered aluminum per 100 parts by weight of resin to control flow during bonding. For the purposes of the following data, bis(2-furfuryl) benzophenone tetracarboxylic imide was used for the bis(furfuryl)imide.

Three titanium panels were cleaned as previously described. One-half inch diameter holes were punched through the panels to coincide with the location of simulated spot-welds, and the joint areas of the panels were coated with the 389°described adhesive resin. The adhesive coating was air dried for 30-minutes at room temperature plus five minutes at 289°K (240°F). After drying, the faying surfaces were mated and assembled in a bonding jig and loaded into a cold-press. Pressure of 700 Newtons/m$^2$ (100 psig) was applied, and the press platen temperature was raised to 477° K at the rate of 5.56 K/minute. Panels were press cured for two hours. Pressure was released after cooling the assembly to less than 422° K and the bonded joints then were postcured in an air circulating oven according to the following schedule:

30-minutes/450 K

-continued 15-minutes/477 K
15-minutes/505 K
15-minutes/533 K
2-hours/561 K
4-hours/589 K The resulting panels were tested statically at room temperature and provided an average breaking load of 9786 N (2200 lbs). Examination of the failed joints showed good flow of the adhesive.

WELD ONLY

Spot-welding of nine titanium plates was carried out on a Sciaky welding machine having the following settings:

| | | |
|---|---|---|
| Tip Pressure | — | 18000 N (4000 lbs) |
| Tip Diameter | — | 12.7 mm (0.5-inch) |
| Gauge No.1 | — | 97 N/m$^2$ (14 psig) |
| Gauge No.2 | — | 234 N/m$^2$ (34 psig) |
| Squeeze Setting | — | 0.3 – 50 |
| Hold Setting | — | 0.75 – 50 |
| Weld Setting | — | 0.75 – 32 |
| Off Setting | — | 0.75 – 55 |
| Phase Shift Setting | — | 27 |
| Nugget Diameter | — | 7.6 mm (0.300-inch) |
| Current Delay | — | None |
| Recompression Delay | — | None |

WELD-BOND ONLY

Specimens for these tests were prepared in the following manner:

EXAMPLE IV

Figure 1:
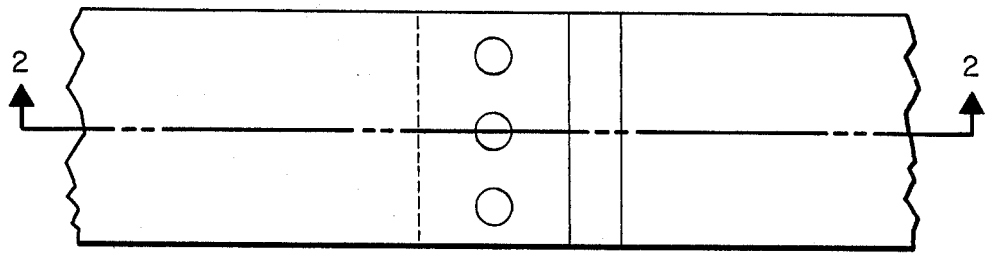
FIG. 1 shows a top elevation view of a lap-joint having three spot-welds.

Titanium alloy 6 Al 4V faying surfaces of lap-shear test panels were vapor degreased, grit blasted with 50 micron alumina and a water rinse. The panels were immersed in solvent for 15-minutes at 294 K, water rinsed and dried at 339 K. The specimens were assembled and spot-welded as shown in FIGS. 1 and 2 using the same settings and machine as in the WELD ONLY method. An adhesive of bis(2-furfuryl) benzophenone tetracarboxylic imide with equal parts of bis(4-maleimidophenyl) methane in 30 percent by weight dimethyl formamide was prepared according to the formulation in Example I. Approximately 150 parts of powdered aluminum per 100 parts by weight of resin was mixed into the adhesive until homogeneous. A bead of the adhesive was applied to the edge of the spot-welded joint. The specimens were air dried for 16-hours at room temperature and were cured for 2-hours at 533 K plus 2-hours at 561 K.

The welded-only specimens were prepared identically to the weld-bonded specimens except the adhesive paste was omitted. Bonded-only panels were prepared as discussed previously.

Figure 3:
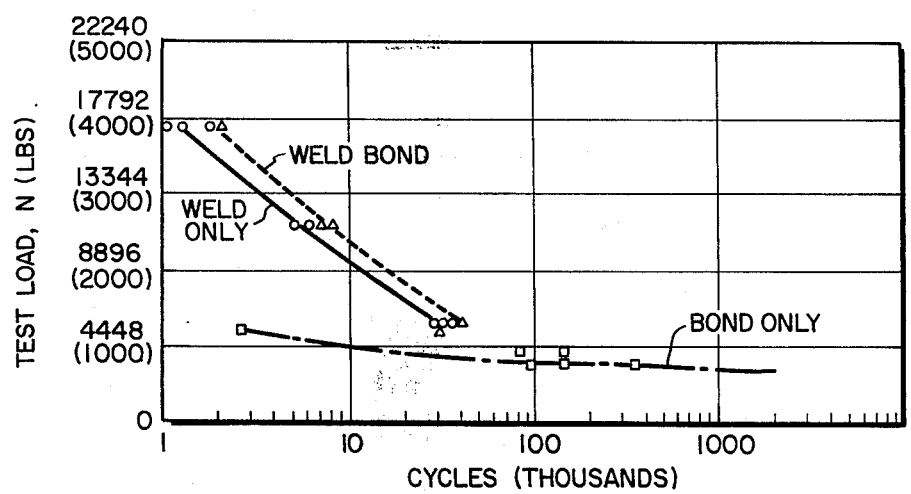
FIG. 3 is a graphic comparison of the fatigue failure of lap-joints under various loadings at room temperature.

Weld-bonded joints according to the present invention were statically and dynamically tested. Generally, weld-bonded joints showed approximately the same strength when statically tested after thermal aging at temperatures ranging from 21° K to 561° K as before thermal aging. More significantly, however, were the results obtained by the fatigue test. These results are shown in FIG. 3 of the drawing.

Fatigue tests involving three specimens of each type of joining at each of the three load-levels set forth in the following table were performed in a Sonntage fixed frequency, fixed wave form, and variable load fatigue tester. All of the specimens were loaded in a clevis-pin grip and cyclic loaded at 1800 cycles per minute (30Hz) at a load ratio of 0.1. Results in Table I, which are plotted in FIG. 3, indicate a significant improvement in fatigue strength of the weld-bonded specimens over the other two methods of joining.

TABLE I

FATIGUE TEST RESULTS FOR WELD-THROUGH PROCESS

| Load Level,[a] % | Cycles at Failure ($\times 10^3$) | | |
|---|---|---|---|
| | Welded-Only | Bonded-Only | Weld-Bonded |
| 60 | 1.0 | 108 | 2.0 |
| | 1.8 | 80 | 2.0 |
| | 1.3 | 3 | 2.0 |
| 40 | 5.5 | 95 | 6.0 |
| | 6.0 | 426 | 6.0 |
| | 5.0 | 178 | 7.0 |
| 20 | 30.0 | [b] | 30.5 |
| | 33.0 | | 30.0 |
| | 31.0 | | 40.0 |

[a]Percent of failure load at room temperature from static tests.
[b]No failure before completion of 1 million cycles.

We claim:

1. A process for weld-bonding titanium comprising:
   A. bringing at least two titanium plates into contact with each other;
   B. spot-welding to joint said plates;
   C. applying a bead of resin adhesive to the edge of the joint: and
   D. heating said adhesive whereby said adhesive flows between said plates by capillary action and cures to form a structurally strong weld-bonded layer.

2. A process according to claim 1 wherein said adhesive consists essentially of equal parts of a bis (furfurylimide) and a bis(maleimide).

* * * * *